Patented Jan. 6, 1942

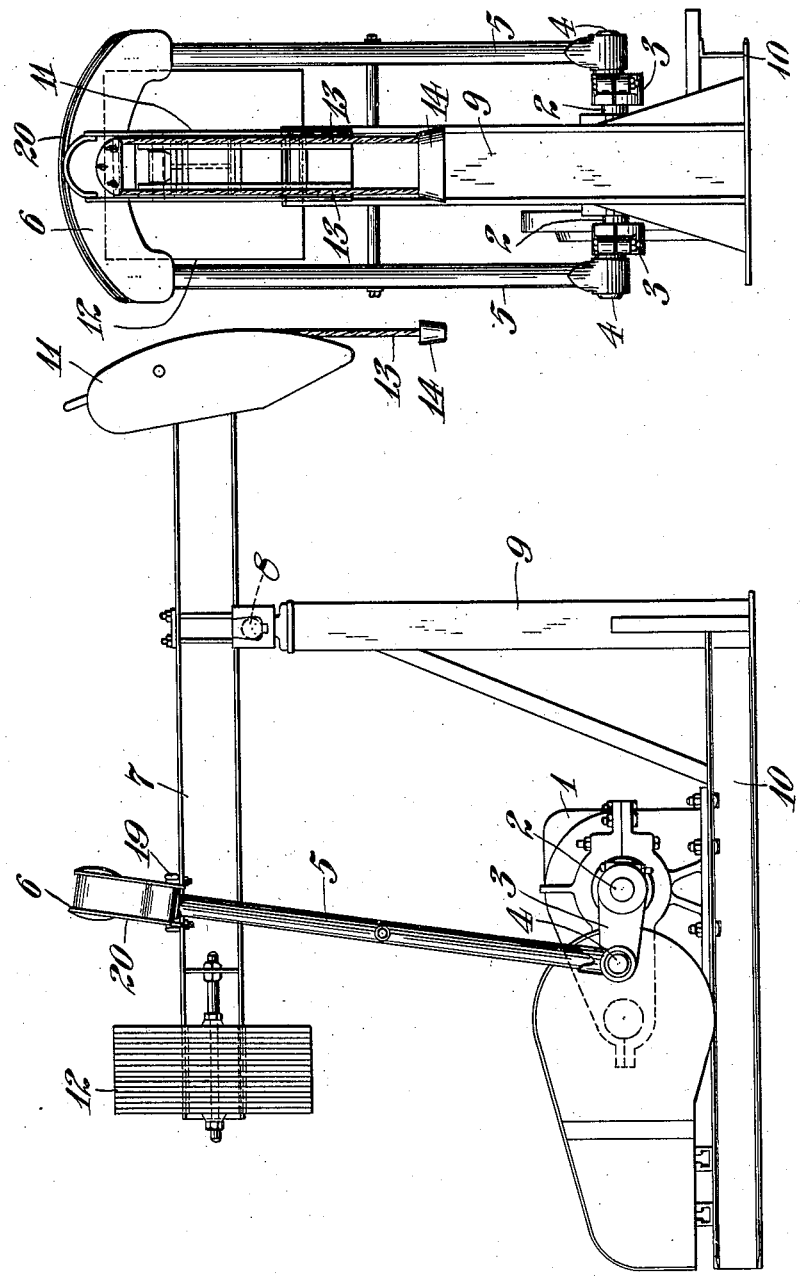

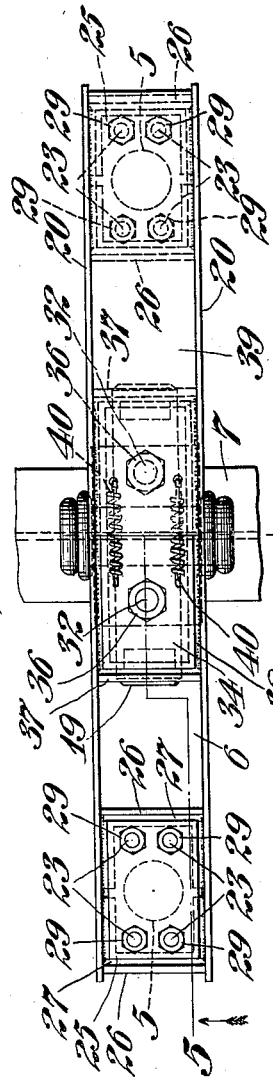

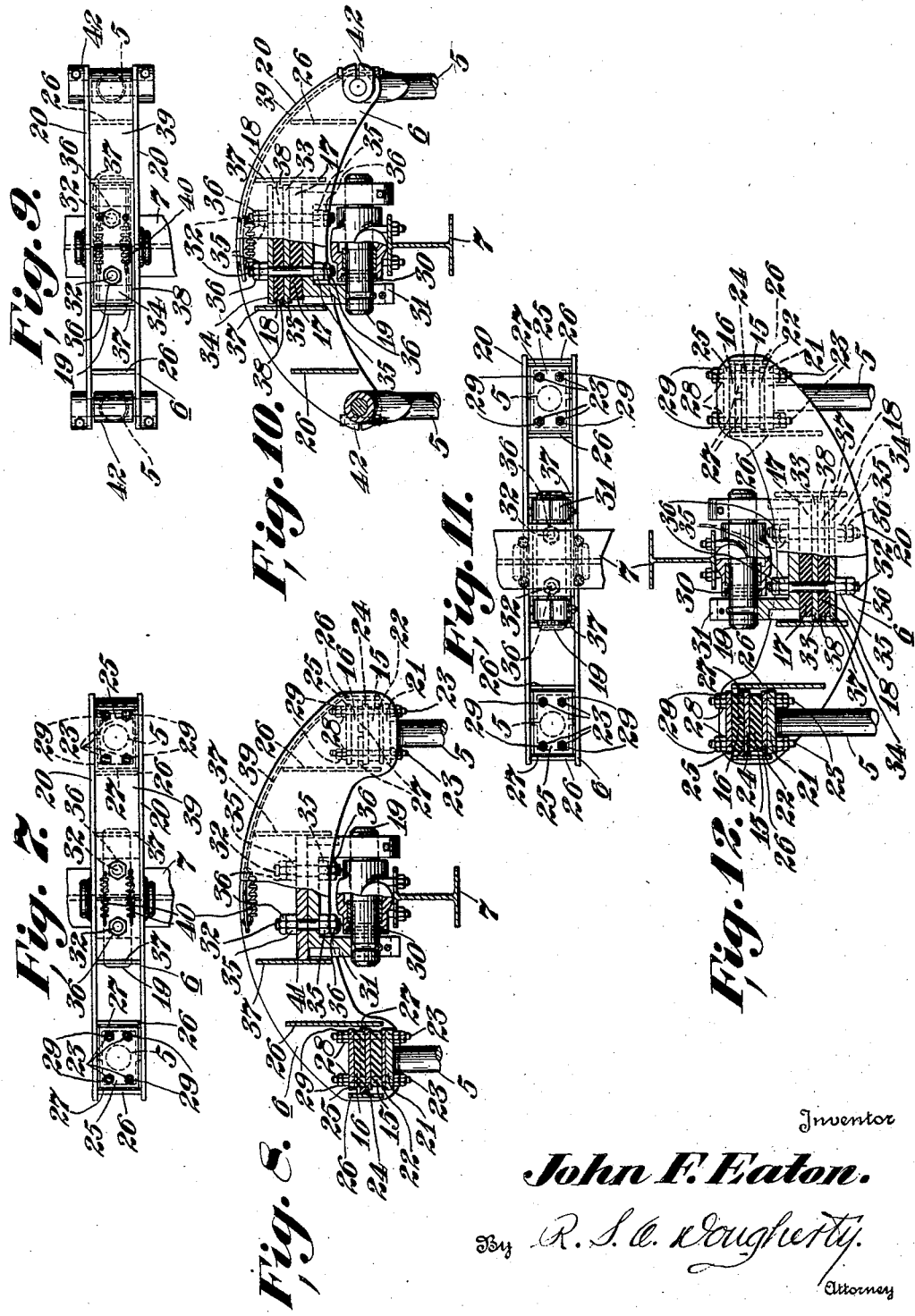

2,268,650

UNITED STATES PATENT OFFICE 2,268,650

EQUALIZER FOR TWIN-CRANK PUMPING UNITS

John F. Eaton, Tulsa, Okla., assignor to Bethlehem Steel Company, a corporation of Pennsylvania Application July 26, 1940, Serial No. 347,656

11 Claims. (Cl. 74—41)

My invention relates to equalizers, and more particularly to resiliently mounted equalizers for twin crank pumping units of the type commonly employed in oil field operations.

The purpose of the equalizer or crossbeam in twin crank pumping units is to divide equally the load between the walking-beam and the two cranks on opposite ends of the reducer shaft. In conventional designs, the equalizer is attached at its center to the walking-beam through a self-aligning bearing called a tail bearing. This bearing consists of a main bearing housing containing the main bearing, which permits oscillation of the pitmans as the crank rotates, its longitudinal axis being at right angles to the walking-beam and parallel to the crankshaft of the reducer. The main bearing housing is suspended in an auxiliary bearing or mounting which permits movement of the main housing about an axis parallel to the longitudinal axis of the walking-beam. Thus the bearing is self-aligning in one direction. The two pitmans are connected to each end of the equalizer through pin connections, the pins being parallel to the walking-beam and to the axis of alignment of the tail bearing, thus compensating for slight differences in angularity of the two cranks, such as might be caused by slight error in angular location of keyways or in the location of wrist-pin holes, or other small manufacturing variations, irregularities, or tolerances, and so preventing internal strain due to misalignment.

In the conventional pin-construction it is apparent that there should be no movement of the pitmans in relation to the equalizer after the pumping unit has been assembled. There should also be no motion of the main tail bearing housing in its alignment mounting. However, in practice there is slight working at these points due to vibration of the walking-beam, and deflection of the beam sidewise under load due to the eccentric loading of the beam section is caused by the fact that the web often is not perpendicular to both flanges. This causes twisting and deflection of the beam in a horizontal plane. Also, the front of the beam may be located slightly to one side of the well, with the result that a side thrust is applied to the front of the beam which varies in magnitude during the stroke or vertical oscillation of the beam, producing vibration and "weaving" of the beam in a horizontal plane. The mounting of the beam on the Samson-post is not sufficiently rigid to prevent this horizontal weaving of the beam, and the beam thus is permitted a limited amount of rotation about a vertical axis through the saddle bearing, due to twisting of the Samson-post. The Samson-post is bound to twist or deflect about its vertical axis under the torque applied to its top by horizontal thrust applied at the front of the walking-beam.

It is apparent that horizontal movement due to any cause at the front of the walking-beam will produce rotation of the beam about its center, thus resulting in similar movement of the rear or tail of the beam, unless damped out by the inertia of the beam itself or compensated for by lateral deflection of the Samson-post, which latter is not likely. Most of the movements of the front of the beam produce almost similar movements at the rear. And it is obvious that any horizontal movement of the rear end of the walking-beam will produce movement of the pitmans in relation to the equalizer.

The pivoted or self-aligning tail bearing is thus made necessary by the foregoing operating conditions, and also by the further requirement of compensating for the fact that the top and bottom flanges of walking-beams are not parallel due to mill tolerance. Even though the bottom flange is level as it rests on the saddle, the top flange on which the tail bearing is usually set may not be level, since the flanges are not necessarily parallel. The alignment arrangement in the bearing compensates for this variable, and also compensates for manufacturing tolerances in angular relation of cranks, length of pitmans, and level of crankshaft of reducer. It eliminates possible binding of the main journal in the tail bearing, and produces uniform bearing pressure across the bearing.

But in the conventional design above described, close-fitting bearings must be provided between the pitmans and the equalizer, yet are subjected only to very slight movement. And since in beam-balanced units the pitmans are alternately in tension and compression, the pin connections and the alignment mounting of the tail bearing must be close-fitting also and can permit no backlash between pin and bearing. Also, trouble sometimes develops from these connections due to lack of lubrication, the slight movement being just enough to cause noise and wear in the connections in some cases of misalignment. Therefore, the pin connections and the self-aligning mounting of the bearing in the conventional construction must be accurately machined, which adds appreciably to the cost of manufacture of the usual pumping unit.

My invention provides a flexible self-aligning connection between pitmans and equalizer, and between equalizer and tail-bearing, but eliminates the expensive pin-connections and self-aligning mounting of the bearing. To dispense with these closely-machined parts is one object of my invention.

Another object of my invention is to provide for sufficient movement of the pitmans in relation to equalizer, and of the equalizer in relation to tail-bearing to take care of alignment.

Another object is to eliminate lost motion between the pitmans and the tail-bearing.

Another object is to provide adjustable means for maintaining the desired compression of the resilient cushion used in my invention.

Another object is to provide an equalizer assembly which is quiet in operation.

Another object is to protect the reduction gears from sudden engine impulses and from well shocks.

A further object is to reduce vibration in the structural members of pumping units.

Another object is to guard against the effects of sunlight and weather on the rubbers used, by a protective covering.

Other objects of my invention will hereinafter appear.

Having thus given a general description of the advantages and objects of my invention, I shall now in order to make the same more clear, refer to the annexed three sheets of drawings forming a part of this specification and in which like characters of reference indicate like parts.

Figure 1 is a side elevation of a pumping unit employing an equalizer assembly of the "three point suspension" type mounted above the walking-beam;

Figure 2 is a front end view of the same pumping unit, facing the beam hanger;

Figure 3 is a top plan view of my equalizer assembly with the left half of the protecting cover removed;

Figure 4 is a horizontal section of one end portion of the equalizer, taken on the line 4—4 of Figure 5, with parts broken away to show more clearly the construction;

Figure 5 is a side elevation of the equalizer, showing the left-hand side in section, taken on the line 5—5 of Figure 3;

Figure 6 is an elevation of the equalizer with the casing on the right-hand side broken away to show more clearly the construction;

Figure 7 is a top plan view of an equalizer assembly of the "two point suspension" type;

Figure 8 is a side elevation of the equalizer assembly shown in Fig. 7;

Figure 9 is a top plan view of an equalizer assembly of the "one point suspension" type;

Figure 10 is a side elevation of the equalizer assembly shown in Fig. 9;

Figure 11 is a top plan view of an equalizer assembly of the "three point underslung" type; and Figure 12 is a side elevation of the equalizer assembly shown in Fig. 11.

Referring now to the various characters of reference on the drawings, the numeral 1 designates the gear reducer, enclosed within a protecting case, 2 the crankshaft thereof, 3 the cranks, 4 the wrist-pins, 5 the flanged pitmans, 6 the equalizer, 7 the walking-beam, 8 the saddle bearing, 9 Samson-post, 10 the base, 11 the beam hanger, 12 counterbalancing weights, 13 cable, and 14 polished rod hanger.

In operation, power from any suitable source (not shown) is transmitted through the gear reducer 1, crankshaft 2, cranks 3, wrist-pins 4, pitmans 5 and equalizer 6 to walking-beam 7. Walking-beam 7 is mounted by saddle bearing 8 upon Samson-post 9 and base 10, and its function is to impart an up and down motion to the horsehead of beam hanger 11 (counterbalanced by weights 12), from which by means of cable 13 and hanger 14 a polished rod (not shown) in well is activated for pumping.

The form of my invention shown comprises rubber cushions 15 and 16 (at the ends of the equalizer), and 17 and 18 (at the center), at all three of the equalizer loading points; that is, at both ends of the equalizer where the pitmans 5 are connected and at the central point where the tail bearing 19 is connected.

Each pitman 5 is connected to ribbed welded bar or crossbeam 20 by a flange attachment 21 at the top end of the pitman, bearing upon the bottom pressure plate 22 against the under side of lower end rubber 15, secured by bolts 23 passing through flange 21, bottom pressure plate 22, lower end rubber 15, suspension plate 24 welded to crossbeam 20, upper end rubber 16, and top pressure plate 25 and held in spaced relation to ribs 26 by spacers 27. Nuts 28 on bolts 23 are kept from unscrewing by jam nuts 29.

Tail bearing 19, equipped for lubrication with oil seals 30, is surmounted by trunnion support 31, upon which rests the under side of lower center rubber 17, fastened by bolts 32 passing through trunnion support 31, lower center rubber 17, center suspension plate 33 welded to crossbeam 20, upper center rubber 18, and top center pressure plate 34, and secured by nuts 35 and jam nuts 36. Spacing to ribs 37 is provided by rubber spacers 38. The continuous side plates of crossbeam 20 help to enclose the rubbers for protection, as does also cover 39, held in position during use by cover springs 40.

It will be noted that by adjusting the nuts 28 and 29 on bolts 23, together with nuts 35 and 36 on bolts 32, the desired initial compression can be set up in the rubbers. Also, when permanent set takes place in the rubbers, the bolts provide a means of maintaining the desired compression. Note that as the bolts are drawn down, the center or suspension plates between the three sets of rubbers remain in line. Thus, the center distance between the wrist pin connections at the lower end of the pitmans and the center of the tail bearing remains constant for any adjustment of the rubbers. This is the chief purpose of the particular construction shown.

When the bolts are properly adjusted to provide the initial compression required, there is no lost motion between the pitmans and the tail bearing. No close machining operations are necessary, only drilled holes for bolts in the metal, and holes moulded in the rubbers. And 90% to 98% of the vibration from the gear reducer is eliminated.

The above description of my invention is for the "three point suspension" or "full floating" type shown in Figs. 1 to 6, inclusive. However, it is obviously possible to construct the equalizer to form: (1) a "two point mounting," comprising rubber cushions at the end connections between pitmans and equalizer only, utilizing the conventional swivel tail-bearing 41 and its connections to the center of the equalizer as shown in Figs. 7 and 8 or (2) a "one point mounting," as in Figs. 9 and 10, comprising rubber cushions only at the center connection between tail bearing and equalizer, utilizing the conventional pin connection 42 between pitmans and equalizer.

In the construction shown in Figs. 1 to 10 inclusive the tail bearing 19 is bolted below the crossbeam and above the walking-beam, but it may equally well be mounted above the crossbeam and below the walking-beam, as in Figs. 11 and 12, if for any purpose an underslung equalizer assembly is desired.

It should be noted also that the term "rubber" as used hereinabove and in the claims includes both natural rubber and synthetic rubber compositions, and it is further apparent that other like resilient media may be substituted therefor without essentially altering the character of my invention.

In short, although I have described my invention in considerable detail, I do not wish to be limited to the exact and specific details shown and described, but I may use such substitutions, modifications or equivalents thereof as are embraced within the spirit and scope of my invention or as pointed out in the claims.

Having thus described my invention, what I claim as new and desire to secure by Letters Patent is:

1. The combination with a twin crank pumping unit for oil well or the like, comprising a base, a Samson post, a walking-beam bearing mounted on said post, a walking-beam mounted for oscillatory motion in said bearing, a tail bearing mounted on said walking-beam, a trunnion support thereon, an equalizer bar pivotally mounted centrally on said walking-beam, a crankshaft, a crank secured to each end of said crankshaft, and a pitman connecting each crank with one end of the equalizer bar, of a non-metallic resilient connection between each pitman and each of the equalizer bar, and a non-metallic resilient connection between the trunnion support and the central point of equalizer bar.

2. The combination with a twin crank pumping unit for oil wells or the like, comprising a base, a Samson post extending upwardly therefrom, a walking-beam bearing mounted on said post, a walking-beam mounted for oscillatory motion in said bearing, a tail bearing upon the walking beam, a trunnion support thereon, a crankshaft, a crank secured to each end of said crankshaft, a flanged pitman attached to each crank, of an equalizer bar pivotally mounted centrally on trunnion support, a resilient connection between each pitman and each end of the equalizer bar, a resilient connection between the trunnion support upon the walking-beam and the central point of the equalizer bar, and enclosing means protecting the resilient connections.

3. The combination with a pumping unit for oil wells or the like, comprising a base, a Samson post extending upwardly therefrom, a walking-beam pivotally mounted for oscillatory motion on said Samson post, a transversely extending equalizer bar pivotally mounted on said walking-beam, a crankshaft, a crank arm secured to each end of said crankshaft, and a pitman connecting each crank arm with one end of the equalizer bar, of a non-metallic resilient connection between the equalizer bar and the walking beam, and a non-metallic resilient connection between each pitman and each end of the equalizer bar.

4. The combination with a twin crank pumping unit for oil wells or the like, comprising a base, a Samson post extending upwardly therefrom, a walking beam pivotally mounted for oscillatory motion on said Samson post, a crankshaft, a crank arm secured to each end of the crankshaft, and a pitman connected to each crank arm, of a transversely extending equalizer bar pivotally mounted on said walking-beam, said equalizer bar having a pair of vertically disposed side plates, a pair of vertical transversely extending spaced rib plates connecting each end portion of the pair of vertically disposed side plates, a horizontal suspension plate connecting the spaced side plates between each pair of spaced rib plates, resilient material on each side of the suspension plates, a crankshaft, a crank arm secured to each end of the crankshaft, each such assembly of suspension plate and resilient material being connected to the upper end of a pitman.

5. The combination with a twin crank pumping unit for oil wells or the like, comprising a base, a Samson post extending upwardly therefrom, a walking-beam pivotally mounted for oscillatory motion on said Samson post, a tail bearing having trunnions extending therefrom attached to the top of the walking-beam, a transversely extending equalizer bar pivotally mounted centrally on the trunnions of the tail-bearing, a crankshaft, a crank arm secured to each end of the crankshaft, a pitman pivotally connected to each crank arm at its lower end, of a non-metallic resilient connection between the tail-bearing and equalizer bar, and a non-metallic resilient connection between the upper ends of the pitmans and the ends of the equalizer bar.

6. The combination with a twin crank pumping unit for oil wells or the like, comprising a Samson post extending upwardly therefrom, a walking-beam pivotally mounted for oscillatory motion on said Samson post, a tail-bearing having trunnions extending therefrom attached to the walking-beam, a crankshaft, a crank arm secured to each end of the crankshaft, a pitman pivotally connected to each crank arm at its lower end, and a flange extending laterally from the upper end of each pitman, of a transversely extending equalizer bar pivotally mounted centrally on the trunnions of the tail-bearing, said equalizer bar having a pair of vertically disposed spaced side plates, a pair of vertical transversely extending spaced rib plates connecting each end and central portion of the pair of vertically disposed side plates, a horizontal suspension plate connecting the spaced side plates between each pair of spaced rib plates, rubber pads on each side of the suspension plates, means for securing the upper flanged ends of the pitmans to the suspension plates and the rubber pads at the outer ends of the equalizer bar, and means for securing the tail-bearing to the suspension plate and rubber pads at the central portion of the equalizer bar.

7. The combination with a twin crank pumping unit for oil wells or the like, comprising a Samson post extending upwardly therefrom, a walking-beam pivotally mounted for oscillatory motion on said Samson post, a tail-bearing having trunnions extending therefrom attached to the walking-beam, a crankshaft, a crank arm secured to each end of the crankshaft, and a pitman connected at its lower end to each crank arm, of a transversely extending equalizer bar pivotally mounted centrally on the trunnions of the tail-bearing, said equalizer bar having a pair of vertically disposed spaced side plates, a pair of vertical transversely extending spaced rib plates connecting the central portion of the pair of vertically disposed side plates, a horizontal suspension plate connecting the spaced side plates between the pair of spaced rib plates, rubber pads on each side of the suspension plate, means for securing the tail-bearing to the suspension plate and rubber pads, and means for connecting each pitman with the ends of the equalizer bar.

8. The combination with a twin crank pumping unit for oil wells or the like, comprising a base, a Samson post extending upwardly therefrom, a walking-beam pivotally mounted for oscillatory motion on said Samson post, a tail-bearing having trunnions extending therefrom attached to the walking-beam, a crankshaft, a crank arm secured to each end of the crankshaft, and a flange at the upper end of each pitman, of a transversely extending equalizer bar pivotally mounted centrally on the trunnions of the tail-bearing, said equalizer bar having a pair of vertically disposed spaced side plates, a pair of vertically transversely extending spaced rib plates connecting each end of the pair of vertically disposed side plates, a horizontal suspension plate connecting the spaced side plates between each pair of spaced rib plates, rubber pads on each side of the suspension plates, and means for connecting the flanged ends of the pitmans to the horizontal suspension plates and rubber pads at the end of the equalizer bar.

9. The combination with a twin crank pumping unit for oil wells or the like, comprising a base, a Samson post extending upwardly therefrom, a walking-beam pivotally mounted for oscillatory motion on said Samson post, a tail-bearing having trunnions extending therefrom attached to the walking beam, a crankshaft, a crank arm secured to each end of the crankshaft, a pitman horizontally connected to each crank arm at its lower end, and a flange extending laterally from the upper end of each pitman, of a transversely extending equalizer bar pivotally mounted centrally on the trunnions of the tail-bearing, said equalizer bar having a pair of vertically disposed spaced side plates, a pair of vertical transversely extending spaced rib plates connecting each end and the central portion of the pair of vertically disposed side plates, a horizontal suspension plate connecting the spaced side plates between each pair of spaced rib plates, a drainage opening between the ends of the suspension plates and the rib plates, a rubber pad at the top and bottom sides of each suspension plate, bolts securing the upper flanged ends of the pitmans to the suspension plates and the rubber pads at the outer ends of the equalizer bar, and bolts for securing the tail-bearing to the suspension plate and rubber pads at the central portion of the equalizer bar.

10. The combination with a pumping unit for oil wells or the like, comprising a base, a Samson post extending upwardly therefrom, a walking-beam bearing mounted on said post, a walking-beam mounted for oscillatory motion in said bearing, an equalizer bar pivotally mounted on said walking-beam, a crankshaft, a crank arm secured to each end of said crankshaft, and a pitman connecting each crank arm with one end of the equalizer bar, of a non-metallic resilient connection between the equalizer bar and the walking-beam, means for guiding the movement of the resilient connection, a non-metallic resilient connection in the equalizer bar between each pitman and each end of the said equalizer bar, and means for guiding the movement of the pivoted upper end of the pitmans.

11. The combination with a twin crank pumping unit for oil wells or the like, comprising a base, a Samson post extending upwardly therefrom, a walking-beam pivotally mounted for oscillatory motion on said Samson post, a tail-bearing having trunnions extending therefrom attached to the walking beam, a crankshaft, a crank arm secured to each end of the crankshaft, a pitman pivotally connected to each crank arm at its lower end, and a flange extending laterally from the upper end of each pitman, of a transversely extending equalizer bar pivotally mounted centrally on the trunnions of the tail-bearing, said equalizer bar having a pair of vertically disposed spaced plates, a pair of vertical transversely extending spaced rib plates connecting each end and central portion of the pair of vertically disposed side plates, a horizontal suspension plate connecting the spaced side plates between each pair of spaced rib plates, a drainage opening between the ends of the suspension plates and the rib plates, a rubber pad at the top and bottom sides of each suspension plate, a pressure plate engaging each rubber pad, bolts extending through the pressure and suspension plates and rubber pads for connecting the flange at the upper end of each pitman thereto at the outer ends of the equalizer bar, bolts extending through the pressure and suspension plates and rubber pads at the central portion of the equalizer bar for securing the tail-bearing thereto, and means for adjusting the pressure on the rubber pads.

JOHN F. EATON.